United States Patent Office 3,378,368
Patented Apr. 16, 1968

3,378,368
TITANIUM-BASE ALLOYS
Clive Dudley Thomas Minton, Shenstone, Lichfield, and Michael George Edwards, Birmingham, England, assignors to Imperial Metal Industries (Kynoch) Limited, London, England, a corporation of Great Britain
No Drawing. Filed June 7, 1965, Ser. No. 462,110
Claims priority, application Great Britain, Jan. 4, 1965, 278/65
19 Claims. (Cl. 75—175.5)

ABSTRACT OF THE DISCLOSURE

Titanium-base alloys useful for the manufacture of high-temperature components which can be fabricated by welding. The alloys consist essentially of aluminum with or without tin as an alpha stabilizer, zirconium, silicon and niobium or tungsten as a beta stabilizer. Optionally copper may be present also.

---

This invention relates to titanium-base alloys and in particular to titanium-base alloys having good creep properties.

Titanium-base alloys have been used in applications requiring good creep resistance at temperatures up to about 450° C., such as in aircraft engines. An alloy which has particularly good creep strength and has been extensively used in aircraft engines, is one which has the normal composition Ti-11Sn-2.25Al-5Zr-1Mo-0.2Si.

This alloy is not regarded as being weldable since welds made in the alloy are to some extent brittle as a result of heating high in the beta field, and the loss of ductility cannot be restored by subsequent heat treatment. For this reason, the alloy cannot be used for applications which require the use of welding for fabrication and a limit is therefore placed on the usefulness of the alloy which otherwise has excellent properties.

We have discovered that this embrittlement is associated with the presence of molybdenum in the alloy and in order to improve the alloy as regards ductility after welding, it is necessary to replace the molybdenum by another element which does not cause embrittlement after welding or adversely affect the excellent creep resistance or unduly increase the density of the alloy.

Alloys in accordance with the invention consist of one or more of the alpha stabilisers, tin and aluminium, in an amount equal to an aluminium equivalent of 5.5–6.5% by weight, aluminium being present in an amount not less than 1.75%, and tin, when present, not exceeding 11.5%, zirconium 3–7%; silicon 0.05–1.0%, up to 2% of one or more of the beta stabilisers niobium and tungsten, copper optionally being present in the range of 0.5–2.5%, balance titanium and usual impurities. Carbon may also be present in the range 0.05–0.4%.

Also according to the invention a titanium-base alloy having high creep strength and good ductility after welding consists of one or more of the alpha stabilisers tin and aluminium in an amount equal to an aluminium-equivalent of 5.5–6.5%, aluminium being present in an amount not less than 1.75%, and tin, when present, not exceeding 11.5%, zirconium 3–7%, silicon 0.05–0.25%, up to 2% of one or more of the beta stabilisers niobium and tungsten, copper optionally being present in the range 0.5–2.5%, balance titanium and usual impurities. Typical ranges of impurities are: carbon 0.01–0.05%, oxygen 0.07–0.2% and nitrogen 0.002–0.02%.

In our prior Patents 3,105,759 and 3,049,425 we have shown that freedom from hydrogen embrittlement is inherent in the 11% tin, 2¼% aluminium base.

Tin may be wholly replaced by aluminium and as far as the effect of the tin on mechanical properties is concerned, one percent aluminium is equivalent to approximately three percent of tin. The aluminium-equivalent of the 11% tin, 2¼% aluminium content of the above-mentioned type of alloy is 6% aluminium and alloys at one end of the range of composition may have the 11% tin, 2¼% aluminium or, at the other end, the 6% aluminium alpha stabiliser content, but intermediate amounts of these alpha stabilisers are permissible. Another advantage of the tin-free composition is a lower density.

The preferred ranges of composition for the various alloying elements are as follows:

|  | Percent |
|---|---|
| Tin | 10.5–11.5 and 0 |
| Aluminium | 1.75–2.75 and 5.5–6.5 |
| Zirconium | 4–6 |
| Silicon | 0.05–0.2 and 0.1–0.5 |
| Niobium | 0.5–2 |
| Tungsten | 0.5–2 |
| Copper | 0.5–2 |
| Carbon | 0.5–0.4 |

Substitution of niobium for molybdenum tends to lower the tensile strength by a small amount, but the ductility after a beta heat-treatment which simulates the thermal effects of welding is increased markedly. If tungsten is substituted for molybdenum, the tensile strength is maintained and the ductility improved, but increasing the tungsten content up beyond 2% further increases the tensile strength but at the expense of ductility. Niobium and tungsten can be present together. Table I illustrates the effect of varying quantities of niobium and tungsten additions and the effects of beta heat-treatment simulating thermal effects of welding. It is to be noted that when molybdenum is present, even with niobium and tungsten, there is some loss of ductility after heating into the beta phase field.

The addition of copper to the above-described alloys improves the tensile properties and in this respect copper behaves similarly to tungsten. Table II shows the effect of copper additions.

Silicon in the range up to 0.25% gives adequate tensile strength for certain applications. A silicon content up to 1% provides higher tensile strength than silicon contents of up to 0.25% whilst the loss of ductility accompanying such increase in strength is comparatively small. Table V shows the effect on tensile strength of increasing the silicon content beyond 0.25%.

Carbon increases the tensile room temperature strength with a tolerable decrease in ductility and without significantly affecting the creep properties at 500° C. and 520° C. and a comparison of the first two alloys listed in Table V shows the effect of increased carbon content.

Creep tests on alloys containing 0.1% carbon and increased silicon are shown in Table VI and it will be seen by comparison with Table III that a further small improvement results from the addition of silicon and carbon.

Alloys can be heat-treated in either the alpha+beta or beta fields before ageing and possess good creep resistance, optimum creep properties being obtained by heat-treatment in the beta field, followed by air-cooling or oil-quenching prior to ageing for 24 hours at 500° C. Table III shows the creep properties obtainable and it will also be seen that the alloys containing nominally 1% niobium or 0.75% tungsten compare favourably with the previously known alloy containing molybdenum listed first in the table.

Alloys in accordance with the invention are thermally stable at elevated temperatures and Table IV shows the results of exposing such an alloy to the effects of heating for prolonged periods. It will be seen that the niobiumbearing alloy does not lose ductility on exposure to service temperatures.

Table VII shows the effects of exposing an alloy containing 0.75% tungsten and 0.3% silicon to elevate temperatures.

The alloys of the invention are particularly useful for the manufacture of compressor drums, wheels, blades and rings for aircraft engines, particularly for components which can be fabricated by welding. In order to meet the conditions of service, the alloys are required to possess good creep resistance and tensile strength at temperatures up to at least 520° C. and also to have good weldability and freedom from embrittlement at these temperatures. Alloys of the invention, as has been shown, combine these properties with a moderate density. Furthermore, these alloys preserve the inherent resistance to embrittlement by hydrogen possessed by the previously known creep-resistant alloys mentioned at the beginning of this specification.

TABLE I.—TENSILE PROPERTIES OF ALLOYS BASED UPON Ti-11 Sn-2¼ Al-5 Zr-0.2 Si and Ti-6 Al-5 Zr-0.2 Si

| Composition | | | | Heat-Treatment | 0.1% P.S., t.s.i. | T.S., t.s.i. | Percent Elong. on $\sqrt{A}$ | Percent R.A. |
|---|---|---|---|---|---|---|---|---|
| Sn | Al | Zr | Si | | | | | |
| 11 | 2¼ | 5 | 0.2+1 Mo | Alpha-beta H.T. and aged | 60.2 | 70.1 | 14 | 34 |
| 11 | 2¼ | 5 | 0.2+1 Mo | Beta H.T.[1] | 57.3 | 72.7 | 9 | 12 |
| 11 | 2¼ | 5 | 0.2+1Nb | Alpha-beta H.T. and aged | 57.3 | 64.2 | 18 | 35 |
| 11 | 2¼ | 5 | 0.2+1Nb | Beta H.T.[1] | 49.8 | 63.2 | 14 | 28 |
| 11 | 2¼ | 5 | 0.2+1 W | Beta H.T. and aged | 58.1 | 70.0 | 16 | 34 |
| 11 | 2¼ | 5 | 0.2+1 W | Beta H.T.[1] | 55.0 | 70.0 | 13 | 24 |
| 11 | 2¼ | 5 | 0.3+2 W | Beta H.T. and aged | 60.3 | 73.8 | 14 | 35 |
| 11 | 2¼ | 5 | 0.3+4 W | do | | | Fractured in grips | |
| 11 | 2¼ | 5 | 0.3+8 W | do | 96.5+ | 99.0 | 4 | 1 |
| 11 | 2¼ | 5 | 0.2+1 Nb+1 W | do | 56.4 | 71.4 | 12 | 11 |
| 11 | 2¼ | 5 | 02.+1 Nb+1 W | Beta H.T.[1] | 58.7 | 73.2 | 10 | 17 |
| 11 | 2¼ | 5 | 0.2+1 Nb+1 Mo | Beta H.T. and aged | 65.6 | 78.4 | 8 | 11 |
| 11 | 2¼ | 5 | 0.2+1 Nb+1 Mo | Beta H.T.[1] | 59.4 | 75.0 | 7 | 8 |
| 11 | 2¼ | 5 | 0.2+0.5 W+0.5 Mo | Beta H.T. and aged | 63.2 | 74.2 | 6 | 9 |
| 11 | 2¼ | 5 | 0.2+0.5 W+0.5 Mo | Beta H.T.[1] | 59.1 | 74.0 | 10 | 12 |
| | 6 | 5 | 0.2+1 Mo | Alpha-beta H.T. and aged | 58.4 | 65.4 | 17 | 36 |
| | 6 | 5 | 0.2+1 Nb | Beta H.T. and aged | 57.8 | 65.4 | 10 | 18 |
| | 6 | 5 | 0.2+1 Nb | Beta H.T.[1] | 52.4 | 60.5 | 14 | 27 |
| | 6 | 5 | 0.2+2 Nb | Alpha-beta H.T. and aged | 52.5 | 61.5 | 17 | 33 |
| | 6 | 5 | 0.2+2 Nb | Beta H.T.[1] | 51.4 | 61.5 | 15 | 27 |
| | 6 | 5 | 0.2+1 W | Alpha-beta H.T. and aged | 53.6 | 64.9 | 15 | 35 |
| | 6 | 5 | 0.2+1 W | Beta H.T.[1] | 51.2 | 62.4 | 13 | 28 |
| | 6 | 5 | 0.2+2 W | Alpha-beta H.T. and aged | 56.4 | 66.8 | 16 | 40 |
| | 6 | 5 | 0.2+2 W | Beta H.T.[1] | 51.2 | 64.3 | 12 | 26 |
| | 6 | 5 | 0.2+1 Nb+1 W | Beta H.T. and aged | 55.6 | 66.2 | 16 | 21 |
| | 6 | 5 | 0.2+1 Nb+1 W | Beta H.T.[1] | 58.0 | 66.0 | 13 | 28 |

[1] ½ hr. 1,100° C., air-cool plus yield pt.
All aged samples heat-treated 24 hours, 500° C., air-cool.

TABLE II.—INFLUENCE OF COPPER ON THE PROPERTIES OF Ti-6Al-5Zr-0.2 Si PLUS NIOBIUM OR TUNGSTEN

| Composition | | | Heat-Treatment | 0.1% P.S., t.s.i. | T.S., t.s.i. | Percent Elong. on $\sqrt{A}$ | Percent R.A. |
|---|---|---|---|---|---|---|---|
| Al | Zr | Si | | | | | |
| 6 | 5 | 0.2+0.5 W+0.5 Cu | Beta heat-treated and aged | 58.2 | 64.6 | 10 | 17 |
| 6 | 5 | 0.2+0.5 W+0.5 Cu | Beta heat-treated | 54.9 | 62.4 | 14 | 21 |
| 6 | 5 | 0.2+1 W+1 Cu | Beta heat-treated and aged | 59.4 | 67.3 | 12 | 19 |
| 6 | 5 | 0.2+1 W+1 Cu | Beta heat-tretaed | 57.4 | 65.2 | 12 | 18 |
| 6 | 5 | 0.2+0.5 Nb+0.5 Cu | Beta heat-treated and aged | 56.0 | 63.4 | 12 | 18 |
| 6 | 5 | 0.2+0.5 Nb+0.5 Cu | Beta heat-treated | 54.6 | 61.8 | 12 | 21 |

All alloys beta heat-treated ½ hr. 1,100° C, air cooled and aged 24 hours 500° C.

TABLE III.—CREEP TESTS ON ALLOYS CONTAINING NIOBIUM

| Composition | | | | Heat-Treated | Creep Test Data | | Initial Plastic Strain, Percent | Percent Total Plastic Strain in— | |
|---|---|---|---|---|---|---|---|---|---|
| Sn | Al | Zr | Si | | Temp., ° C. | Stress t.s.i. | | 100 hr. | 300 hr. |
| 11 | 2¼ | 5 | 0.2+1 Mo | 1 hour 900° C., air cool / 24 hours 500° C., air cool | 450 | 25 | Nil | 0.057 | 0.088 |
| 11 | 2¼ | 5 | 0.2+1 Mo | do | 500 | 15 | Nil | 0.077 | 0.111 |
| 11 | 2¼ | 5 | 0.2+1 Nb | Alpha-beta H.T. and aged | 450 | 25 | Nil | 0.079 | 0.110 |
| Nil | 6 | 5 | 0.2+1 Nb | do | 450 | 25 | Nil | 0.043 | 0.054 |
| Nil | 6 | 5 | 0.3+1 Nb | do | 500 | 19 | Nil | 0.259 | 0.535 |
| Nil | 6 | 5 | 0.2+1 Nb | Beta H.T. and aged | 500 | 19 | Nil | 0.041 | 0.055 |
| Nil | 6 | 5 | 0.3+0.75 W | Alpha-beta H.T. and aged | 450 | 25 | Nil | 0.152 | 0.188 |
| Nil | 6 | 5 | 0.3+0.75 W | Beta H.T. and aged | 450 | 25 | Nil | 0.033 | 0.039 |
| Nil | 6 | 5 | 0.3+0.75 W | Alpha-beta H.T. and aged | 400 | 30 | 0.007 | 0.102 | 0.138 |
| Nil | 6 | 5 | 0.3+0.75 W | Beta H.T. and aged | 400 | 30 | 0.006 | 0.031 | 0.040 |
| Nil | 6 | 5 | 0.3+0.75 W | do | 520 | 20 | Nil | 0.073 | |
| Nil | 6 | 5 | 0.3+0.75 W | Beta H.T. and aged [1] | 520 | 20 | Nil | 0.078 | |

[1] Sample oil-quenched from solution treatment temperature.
Samples air cooled from solution treatment temperature and aged 24 hours, 500° C.

TABLE IV.—COMPARATIVE EXPOSURE TESTS

| Exposure Data | | Ti-11 Sn-2¼ Al-5 Zr-1 Mo-0.2 Si | | | | Ti-11 Sn-¼ Al-5 Zr-0.2 Si-1 Nb | | | |
|---|---|---|---|---|---|---|---|---|---|
| Temp., °C. | Time, hrs. | Y.P., t.s.i. | T.S., t.s.i. | Percent Elong. on NA | R.A., percent | 0.1% P.S. t.s.i. | T.S., t.s.i. | Percent Elong. on √A | R.A., percent |
| (¹) | (¹) | 63.2 | 69.3 | 18 | 48 | 54.4 / 56.6 | 64.7 / 64.2 | 14 / 16 | 26 / 31 |
| 550–560 | 500 / 1,000 | 66.3 | 68.7 | 15 | 30 | 61.3 / 59.3 | 67.2 / 66.2 | 13 / 10 | 21 / 23 |
| 600 | 500 / 1,000 | 65.2 | 68.7 | 12 | 29 | 59.3 / 59.5 | 66.5 / 66.8 | 15 / 14 | 22 / 22 |

¹ Control.
All specimens heat-treated 1 hour, 900° C., air-cool plus 24 hours, 500° C.

TABLE V.—TENSILE PROPERTIES OF ALLOYS BASED UPON TI-6 AL-5 ZR+SI AND TI-11 SN-2¼ AL-5 ZR+SI

| Composition | | | | 0.1% P.S. t.s.i. | T.S., t.s.i. | Percent Elong. on √A | R.A., Percent |
|---|---|---|---|---|---|---|---|
| Sn | Al | Zr | Si | | | | |
|  | 6 | 5 | 0.3+1 Nb+0.1 C | 58.9 | 66.4 | 12 | 14 |
|  | 6 | 5 | 0.3+1 Nb | 56.2 | 62.8 | 14 | 25 |
|  | 6 | 5 | 0.5+1 Nb | 60.5 | 69.8 | 10 | 15 |
|  | 6 | 5 | 0.75+1 Nb | 63.8 | 71.0 | 18 | 30 |
|  | 6 | 5 | 1.0+1 Nb | 76.0 | 73.6 | 12 | 21 |
| 11 | 2¼ | 5 | 0.3+1 Nb | 56.4 | 66.3 | 18 | 41 |
| 11 | 2¼ | 5 | 0.5+1 Nb | 54.7 | 67.2 | 13 | 23 |
| 11 | 2¼ | 5 | 0.75+1 Nb | 59.7 | 68.5 | 18 | 36 |
| 11 | 2¼ | 5 | 1.0+1 Nb | 60.5 | 72.5 | 15 | 27 |

All alloys solution heat-treated at approximately 30° C. above alpha + beta/beta transus temperature, air-cooled, and aged 24 hours at 500° C.

TABLE VI.—CREEP TESTS ON THE CARBON-BEARING ALLOY

| Composition | | | Heat-Treatment | Creep Test Data | | Initial Plastic Strain, Percent | Percent Total Plastic Strain In— | |
|---|---|---|---|---|---|---|---|---|
| Al | Zr | Si | | Temp., °C. | Stress, t.s.i. | | 100 hr. | 300 hr. |
| 6 | 5 | 0.3+1 Nb+0.1 C | Beta heat-treated | 500 | 20 | Nil | 0.035 | 0.060 |
| 6 | 5 | 0.3+1 Nb+0.1 C | do | 520 | 20 | Nil | 0.093 | |

TABLE VII.—INFLUENCE OF EXPOSURE AT ELEVATED TEMPERATURES ON THE TENSILE PROPERTIES OF THE ALLOY TI-6 AL-5 ZR-0.75 W-0.3 SI

| Condition | Exposure, Temp. °C. | Time of Exposure (4 hrs.) | 0.1% P.S. t.s.i. | U.T.S., t.s.i. | Percent Elong. on √A |
|---|---|---|---|---|---|
| Beta heat-treated, air-cooled and aged | 500 | 0 | 61.0 | 66.4 | 10 |
|  | 500 | 100 | 62.0 | 67.4 | 11 |
|  | 500 | 300 | 61.2 | 67.7 | 11 |
| Beta heat-treated, oil quenched and aged | 525 | 0 | 61.2 | 68.1 | 16 |
|  | 525 | 100 | 62.7 | 70.0 | 14 |

Properties determined on 0.6 in. dia. rod. Beta-heat-treated ¾ hour, 1,045° C. and aged 24 hours, 500° C.

We claim:
1. A titanium-based alloy having high creep-strength and good ductility after welding consisting essentially of at least one alpha stabilizer selected from the group consisting of aluminum and tin, said aluminum always being present in an amount not less than 1.75% and tin, when present, not exceeding 11.5%, said total amount of aluminum and tin being in an amount equivalent to an aluminum equivalent of 5.5–6.5% by weight, said aluminum equivalent being calculated as one percent aluminum equivalent to approximately three percent tin, zirconium 3–7%, silicon 0.05–1% from about 0.5 to 2% of a beta stabilizer selected from the group consisting of niobium and tungsten, balance titanium and impurities.

2. A titanium-base alloy as claimed in claim 1 containing in addition 0.05–0.4% carbon.

3. A titanium-base alloy according to claim 1 containing 10.5–11.5% tin.

4. A titanium-base alloy according to claim 1 containing 1.75–2.75% aluminum.

5. A titanium-base alloy according to claim 1 containing 5.5–6.5% aluminum.

6. A titanium-base alloy according to claim 1 containing 4–6% zirconium.

7. A titanium-base alloy according to claim 1 containing 0.1–0.5% silicon.

8. A titanium-base alloy according to claim 1 containing 0.5–2% niobium.

9. A titanium-base alloy according to claim 1 containing 0.5–2% tungsten.

10. A titanium-base alloy according to claim 1 containing 0.5–2% copper.

11. A titanium-base alloy having high creep-strength and good ductility after welding consisting of 10.5–11.5% tin, 1.75–2.75% aluminum, 4–6% zirconium, 0.5–2% niobium, 0.5–1% silicon, balance titanium and impurities.

12. A titanium-base alloy having high creep-strength and good ductility after welding consisting of 10.5–11.5% tin, 1.75–2.75% aluminum, 4–6% zirconium, 0.5–2% tungsten, 0.5–1% silicon, balance titanium and impurities.

13. A titanium-base alloy having high creep-strength and good ductility after welding consisting of 10.5–11.5% tin, 1.75–2.75% aluminum, 4–6% zirconium, 1% niobium, 1% tungsten, 0.5–1% silicon, balance titanium and impurities.

14. A titanium-base alloy having high creep-strength and good ductility after welding consisting of 5.5–6.5% aluminum, 4–6% zirconium, 0.5–2% niobium, 0.5–1% silicon, balance titanium and impurities.

15. A titanium-base alloy having high creep-strength and good ductility after welding consisting of 5.5–6% aluminum, 4–6% zirconium, 0.5–2% tungsten, 0.5–1% silicon, balance titanium and impurities.

16. A titanium-base alloy having high creep strength and good ductility after welding consisting of 5.5–6.5% aluminum, 4–6% zirconium, 1% niobium, 1% tungsten, 0.5–1% silicon, balance titanium and impurities.

17. A titanium-base alloy according to claim 13 containing in addition 0.05–0.4% carbon.

18. A titanium-base alloy having high creep-strength and good ductility after welding consisting of 6% aluminum, 5% zirconium, 0.75% tungsten, 0.5–1% silicon, balance titanium and impurities.

19. A titanium-base alloy having high creep-strength and good ductility after welding consisting of 6% aluminum, 5% zirconium, 1% niobium, 0.3% silicon, 0.1% carbon, balance titanium and impurities.

References Cited

UNITED STATES PATENTS

| | | | |
|---|---|---|---|
| 2,769,707 | 11/1956 | Vordahl | 75—175.5 |
| 2,893,864 | 7/1959 | Harris et al. | 75—175.5 |
| 3,049,425 | 8/1962 | Fentiman et al. | 75—175.5 |
| 3,105,759 | 10/1963 | Fentiman et al. | 75—175.5 |

FOREIGN PATENTS 944,954  12/1963  Great Britain.

CHARLES N. LOVELL, *Primary Examiner.*